United States Patent
Wilde et al.

(10) Patent No.: US 12,474,227 B2
(45) Date of Patent: Nov. 18, 2025

(54) ROD-MOUNTED PRESSURE SENSOR

(71) Applicant: KUPFERLE, LLC, St. Louis, MO (US)

(72) Inventors: Kyle J. Wilde, Hillsboro, MO (US); Daniel C. Lorentz, Des Peres, MO (US)

(73) Assignee: KUPFERLE, LLC, St. Louis, MO (US)

( * ) Notice: Subject to any disclaimer, the term of this patent is extended or adjusted under 35 U.S.C. 154(b) by 361 days.

(21) Appl. No.: 18/120,276

(22) Filed: Mar. 10, 2023

(65) Prior Publication Data

US 2023/0288280 A1 Sep. 14, 2023

Related U.S. Application Data

(60) Provisional application No. 63/319,097, filed on Mar. 11, 2022.

(51) Int. Cl.
*G01L 19/00* (2006.01)
*G01L 19/14* (2006.01)

(52) U.S. Cl.
CPC ........ *G01L 19/0007* (2013.01); *G01L 19/147* (2013.01)

(58) Field of Classification Search
None
See application file for complete search history.

(56) References Cited

U.S. PATENT DOCUMENTS

| 10,941,545 B2 * | 3/2021 | Sitnikov ................. H04Q 9/00 |
| 10,968,609 B2 | 4/2021 | Sitnikov et al. |
| 2020/0232863 A1 | 7/2020 | Moreno et al. |
| 2022/0205536 A1 * | 6/2022 | Kurowska .............. F16J 15/025 |

FOREIGN PATENT DOCUMENTS

| CN | 107421671 A | * 12/2017 | ............... G01L 5/00 |
| CN | 109029346 A | * 12/2018 | ............... G01C 5/00 |
| CN | 112922091 A | * 6/2021 | ............... E03B 7/12 |

OTHER PUBLICATIONS

A.Y. Mcdonald Mfg. Co., Water Sampling Just Got Easier, Water Works, https://www.aymcdonald.com/post/water-sampling-just-got-easier, 2021, pp. 1-3, Dubuque, Iowa.
Kupferle; Mainguard # 78; https://hydrants.com/product/mainguard-78/ (2018).
SITRON USA, User Manual, Series: SP Pressure Transmitters, Aug. 2016, pp. 1-27, Hauppauge, NY.

* cited by examiner

*Primary Examiner* — Peter J Macchiarolo
*Assistant Examiner* — Jermaine L Jenkins
(74) *Attorney, Agent, or Firm* — Sandberg Phoenix & von Gontard, P.C.

(57) ABSTRACT

A pressure sensor assembly includes a sensor mounted in a sensor holder. The sensor holder is mounted to a lower end of a rod. The rod extends from a subterranean water supply to ambient. The lower end of the assembly forms a sliding seal with an upwardly opening cylindrical seat communicating with the subterranean water supply. An upper end of the pressure sensor assembly includes a cap locking the assembly to a protective pipe surrounding the rod.

18 Claims, 5 Drawing Sheets

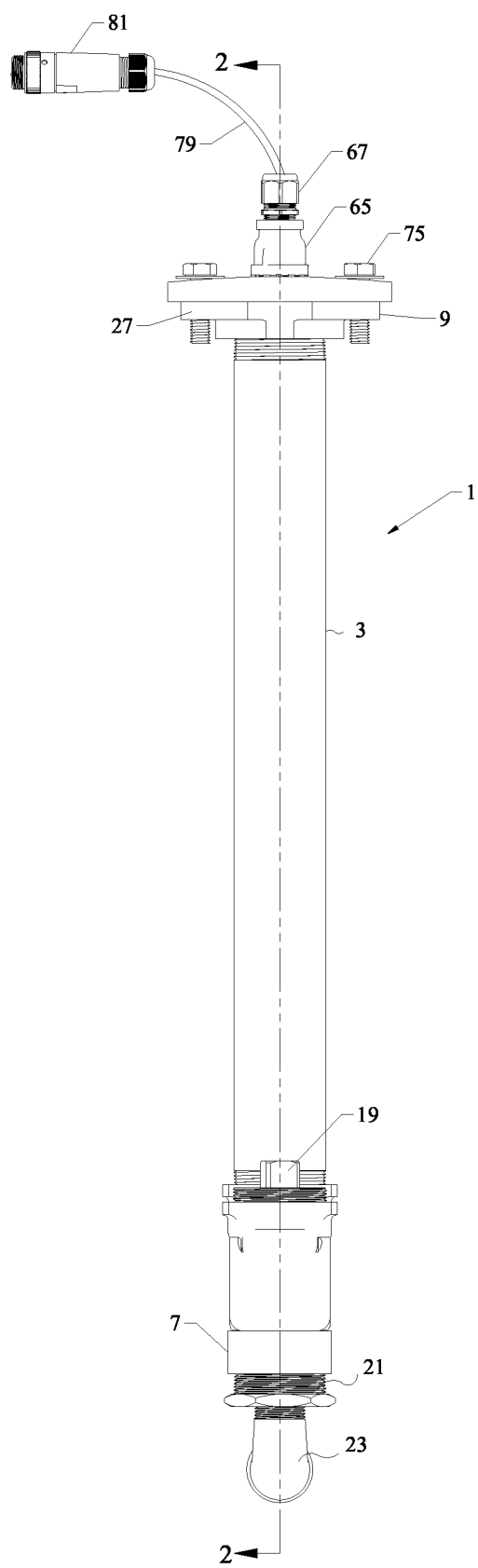
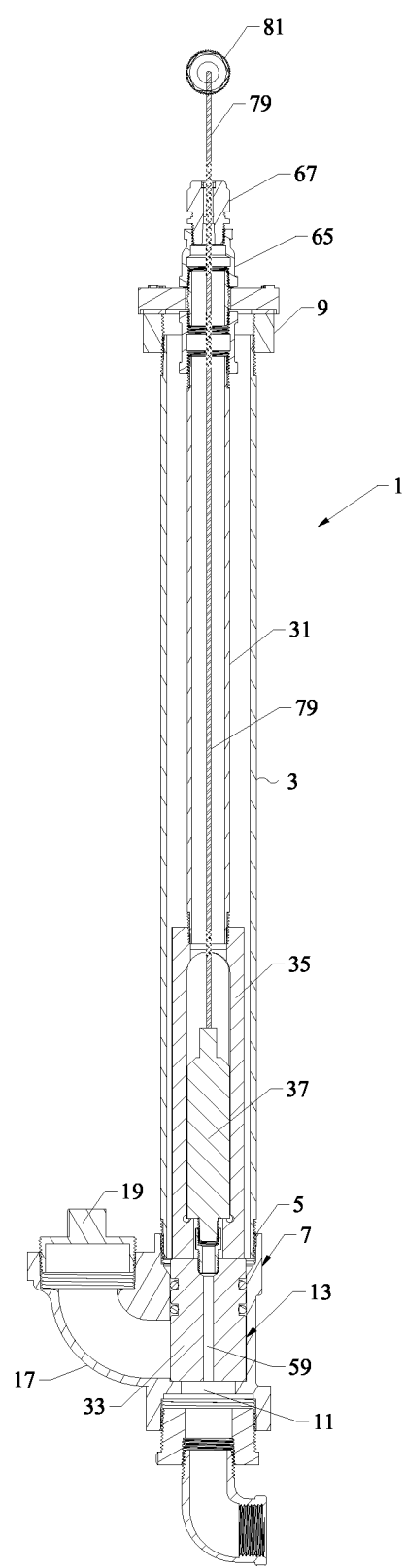
FIG. 1
FIG. 2

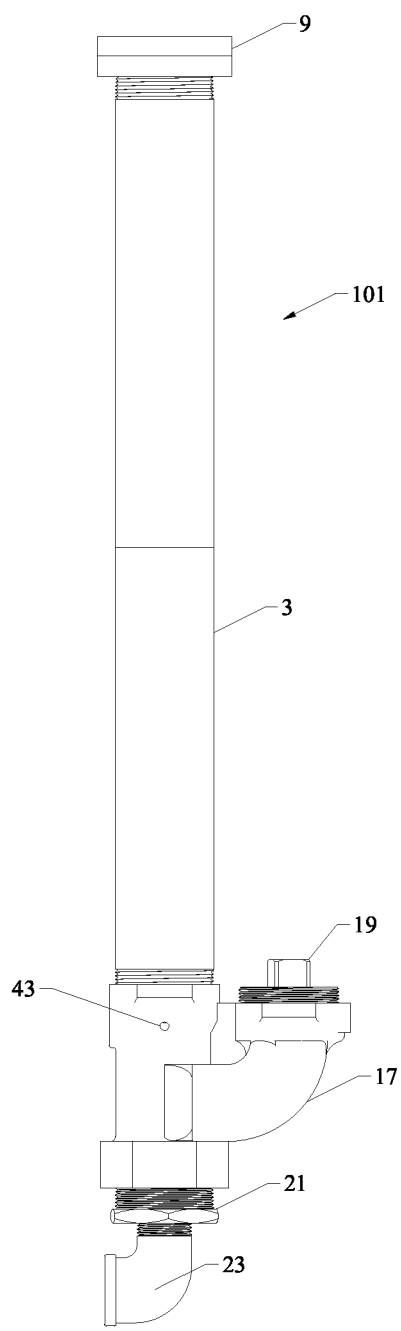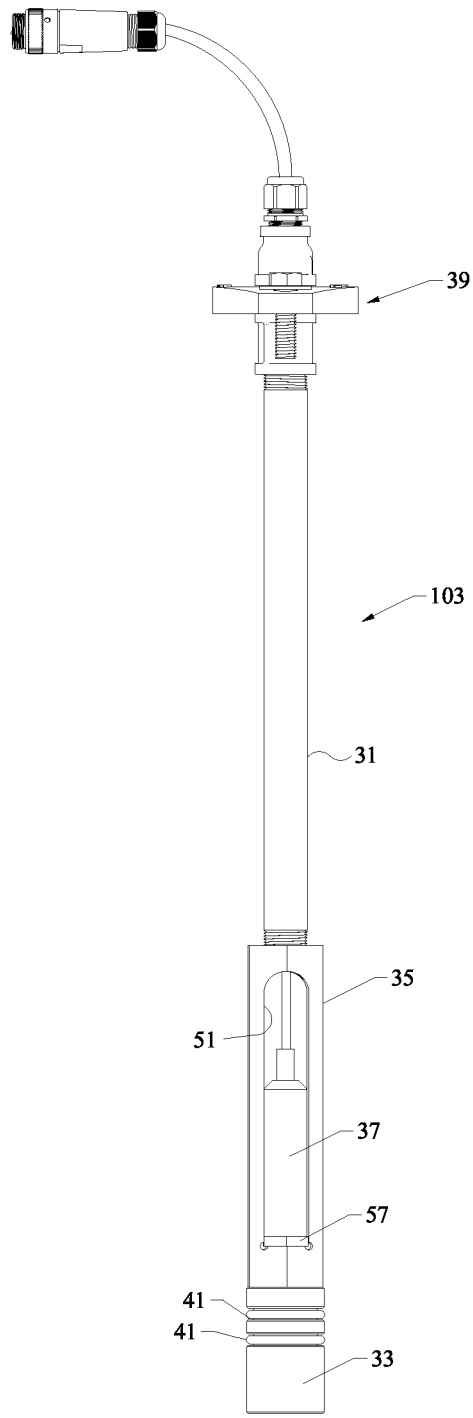
FIG. 3A
FIG. 3B

ROD-MOUNTED PRESSURE SENSOR

CROSS-REFERENCE TO RELATED APPLICATIONS

This application claims the benefit of U.S. Provisional Application 63/319,097, filed Mar. 11, 2022, the entire contents of which, including the Appendices, are hereby incorporated by reference.

STATEMENT REGARDING FEDERALLY SPONSORED RESEARCH

Not applicable.

BACKGROUND OF THE INVENTION

Monitoring of subterranean water systems, such as municipal drinking water systems, is a longstanding and increasingly important task. One indication of a leak in the system is a drop in pressure in the vicinity of the leak. Therefore, it has been recognized as desirable to monitor pressure widely throughout the system. One proposed approach has been to install pressure sensors in fire hydrants or flushing hydrants throughout the system, each equipped with a data transmission system to transmit pressure data to a central location. That approach, however, involves extensive modification of existing hydrants, particularly in climates where freezing is a problem and hydrant barrels are normally dry, so that sensors must be installed below the hydrant shut-off valve in the main feeding the hydrant.

BRIEF SUMMARY OF THE INVENTION

In accordance with an embodiment of the present invention, a pressure sensor is mounted in a subterranean water supply by a straight, elongate rod. In embodiments, the rod is attached to the pressure sensor and remains connected to the pressure sensor when the pressure sensor is installed in a water distribution pipe. In some of these embodiments, the lower end of the rod is attached to the pressure sensor, and the upper end of the rod is releasably attached to a fitting which prevents upward movement of the rod and pressure sensor. In some of these embodiments, the fitting is mounted to the top of a jacket pipe surrounding the rod. The top of the jacket pipe is conveniently accessible from ground level, illustratively within about one foot of ground level. The jacket pipe may be mounted at its lower end to the subterranean water distribution pipe.

In embodiments, the jacket pipe and pressure sensor are mounted to a fitting which is directly attached to the exterior of an inlet valve body of a hydrant. This construction allows the pressure sensor to be buried with the hydrant inlet, but also allows the pressure sensor to be removed without digging and without disturbing the hydrant.

In embodiments, other water condition sensors are attached to the lower end of the rod, either in place of or in addition to the pressure sensor.

In accordance with embodiments of the present invention, a water condition sensor is mounted in a subterranean water distribution system by a straight, elongate rod extending through a protective sleeve, the rod having at its lower, distal end a lower fitting holding the condition sensor and at its upper, proximal end a mounting fitting, the protective sleeve being attached at its distal end to a subterranean water pipe and having at its proximal end a fitting releasably attachable to the mounting fitting of the rod. In embodiments, the lower fitting forms a slidable seal with the sleeve or with a fitting holding the sleeve.

BRIEF DESCRIPTION OF THE DRAWINGS

FIG. 1 is a view in right side elevation of an illustrative embodiment of pressure sensor assembly of the present invention.

FIG. 2 is a sectional view taken along the line 2-2 of FIG. 1.

FIG. 3A is a view in front elevation of a non-removable part of the pressure sensor assembly of FIGS. 1 and 2.

FIG. 3B is a view in right side elevation of a removable sensor rod part of the pressure sensor assembly of FIGS. 1 and 2.

Corresponding reference numerals will be used throughout the several figures of the drawings.

DETAILED DESCRIPTION

Figure 4:
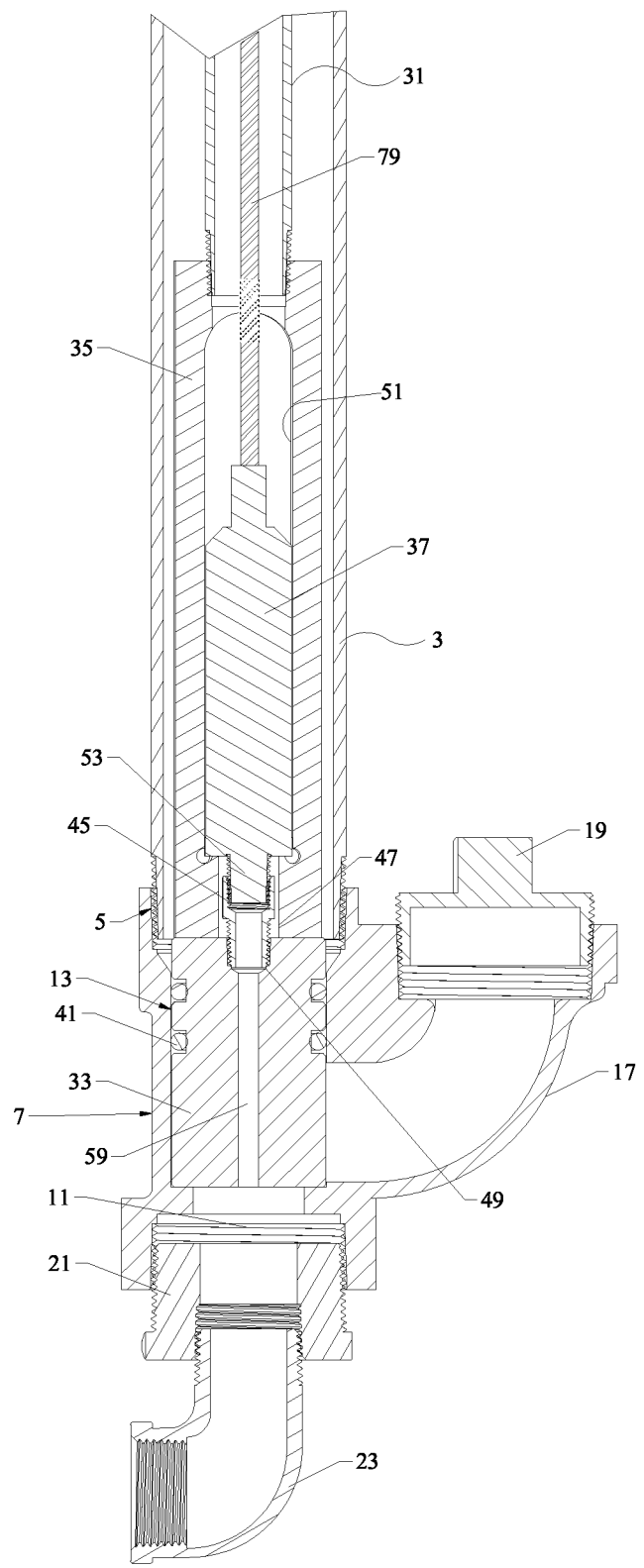
FIG. 4 is an enlarged left side cross-section of a lower, buried, part of the pressure sensor assembly of FIGS. 1-3B.
Figure 5:
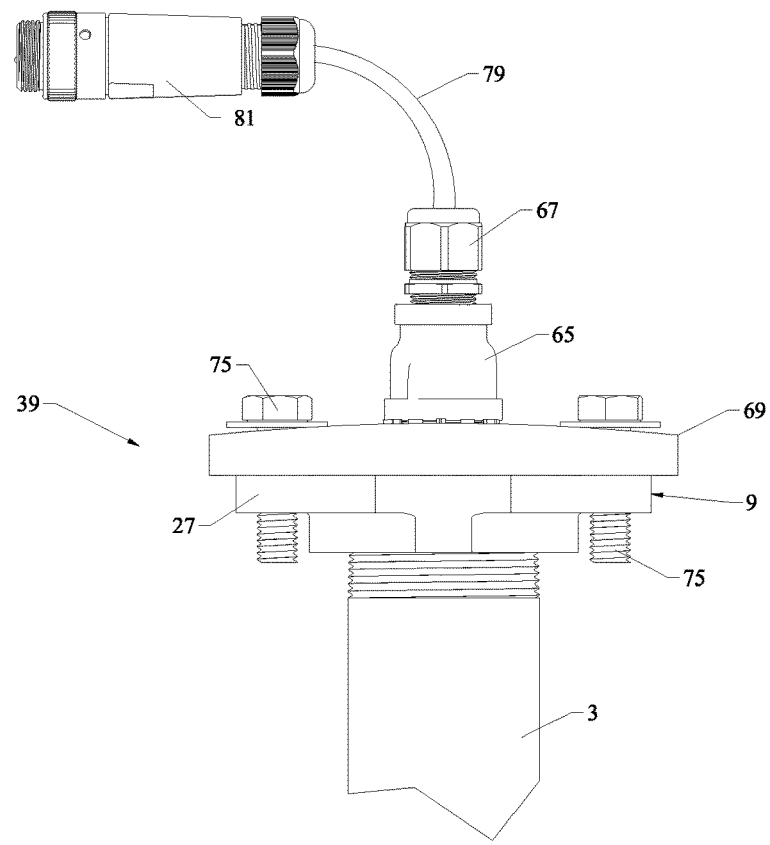
FIG. 5 is an enlarged view in right side elevation, corresponding to FIG. 1, of an upper, accessible, portion of the pressure sensor assembly of FIGS. 1-4.
Figure 6:
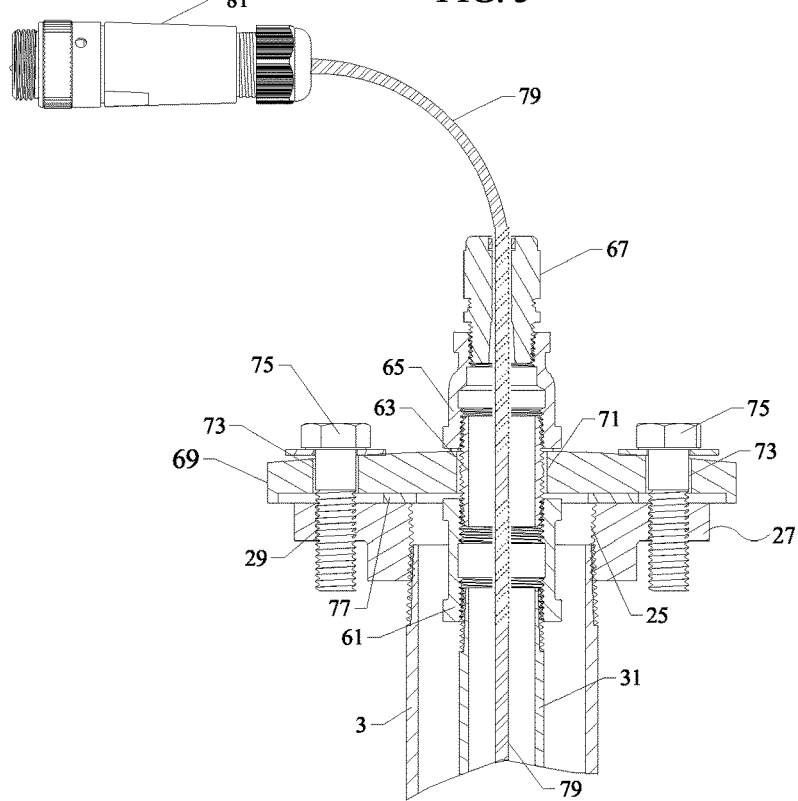
FIG. 6 is an enlarged cross-sectional view, corresponding to FIG. 2, of the upper, accessible portion of the pressure sensor assembly shown in FIG. 5.

The following detailed description illustrates the claimed invention by way of example and not by way of limitation. This description will clearly enable one skilled in the art to make and use the claimed invention, and describes several embodiments, adaptations, variations, alternatives, and uses of the claimed invention, including what I presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Referring now to the drawings, and in particular to FIGS. 1-6, reference numeral 1 indicates a first illustrative embodiment of a pressure sensor assembly of the invention. The pressure sensor assembly 1 includes a fixed part 101 (FIG. 3A) and a removable sensor rod assembly 103 (FIG. 3B).

The fixed part 101 of the pressure sensor assembly 1 includes a two-inch steel barrel pipe 3, the lower end of which is threaded into an upper opening 5 of a plunger seat body 7, and the upper end of which is threaded into an iron neck 9.

The plunger seat body 7 includes a threaded inlet 11, an upwardly-opening cylindrical seat 13, the threaded upper opening 5, and a side arm 17. A plug 19 is threaded into and seals the side arm 17. An adapter 21 and elbow 23 are threaded into the inlet 11. The elbow 23 in use is connected to a subterranean water pipe, illustratively forming a part of a subterranean water distribution system.

The neck 9 illustratively has a threaded central opening 25 and ears 27 with threaded bolt holes 29.

The barrel pipe 3 is sized to extend from the subterranean water pipe to near ground level, so as to make its upper end easily accessible from above grade.

The barrel pipe 3 houses the sensor rod assembly 103, shown particularly in FIG. 3B, and forms a protective sleeve for the sensor rod assembly 103. The sensor rod assembly 103 includes a hollow rod in the form of a three-quarter inch conduit pipe 31, a plunger or piston 33, a sensor holder 35 carrying a pressure sensor 37, and a top cap assembly 39.

As shown particularly in FIGS. 3B and 4, plunger 33 includes two O-rings 41 which form a water-tight sliding fit with the cylindrical seat 13 of the plunger seat body 7. A small drain hole 43 in the wall of the cylindrical seat 13 above the plunger 33 permits any water that finds its way into the barrel pipe 3 to drain when the water table is below the hole 43, as shown in FIG. 3A.

The sensor holder 35 includes an open side 51 to allow easy access to the pressure sensor 37.

The sensor holder 35 sits on top of the plunger 33 and is loosely held to the top of the plunger 33 by a threaded female/male pipe fitting 45, which extends through a central bore 47 in the bottom wall of the sensor holder 35 and is threaded into an opening 49 in the top of the plunger 33. A threaded inlet 53 at the lower end of the pressure sensor 37 is threaded into the threaded female/male pipe fitting 45, holding the sensor holder 35 into engagement with the plunger 33. An integral hexagonal structure 57 at the lower end of the pressure sensor 37 prevents the pressure sensor 37 from spinning with respect to the sensor carrier 35. This allows the female/male pipe fitting 45 to be tightened onto the sensor 37, that assembly inserted into the sensor carrier 35 through the open side 51, and the plunger 33 tightened onto the female/male pipe fitting 45 to complete the assembly.

An axial opening 59 through the plunger 33 forms a passage that puts the threaded inlet 53 of the pressure sensor 37 in fluid communication with the inlet 11 of the plunger seat body 7 to measure local water pressure in the subterranean water distribution system.

The conduit pipe 31 is threaded into the top of the sensor holder 35.

The top cap assembly 39 includes a brass connecting nut 61 threaded to the top of conduit pipe 31, a nipple 63 threaded into the upper end of the connecting nut 61, a female/female pipe fitting 65 threaded onto the upper end of the nipple 63, and a cord grip 67 threaded into the top of the female/female pipe fitting 65. A cast eared flange 69 includes a central opening 71 through which the nipple 63 passes. The eared flange 69 is trapped between the connecting nut 61 and the female/female pipe fitting 65. The eared top cap 69 includes unthreaded bolt holes 73 which align with threaded holes 29 in the ears 27 of the neck 9 threaded onto the top of the barrel pipe 3. Bolts 75 through the bolt holes 73 and 29 secure the top cap assembly 39, hence the sensor rod assembly 103, to the neck 9, hence to the barrel pipe 3, thereby holding the plunger 33 and sensor 37 in a fixed vertical position. A top cap gasket 77 seals the eared neck 9 to the eared flange 69. The top cap assembly 39 thus acts as a mounting fitting which holds the sensor rod assembly 103 in the protective sleeve 3 and prevents vertical movement of the rod assembly.

A wire bundle 79 is connected at its upper end to a leak-proof electrical connector 81. The wire bundle 79 extends through the cord grip 67 to the pressure sensor 37. It will be seen that the wire bundle 79 extends through the sensor holder 35, the conduit pipe 31, and the top cap assembly 39 from the sensor 37 to ambient and is protected by them. The wire bundle 79 carries power to and signals from the pressure sensor 37.

The sensor 37 is a submersible pressure sensor, with a threaded inlet 144, sold by Sitron USA, Hauppauge, New York, as its model SP68, described in detail in Sitron User Manual, Series: SP, identified as SP_06_2016. The pressure sensor 5 is powered by a 12 to 30 V DC source. The output of the sensor is a 4-20 mA signal carried by the wire bundle 79. The output may be read as an analog value or may be converted to a digital signal using a HART modem. The output signal may be displayed locally, or it may be transmitted to a remote location.

Those skilled in the art will recognize that this embodiment of pressure sensor assembly 1 utilizes and modifies many components of the Kupferle Mainguard #78 flushing hydrant, available commercially from Kupferle Foundry Company, St. Louis, Missouri. The pressure sensor assembly 1 modifies the Mainguard #78 in several ways. The plunger 33 is inverted, and the axial opening 59 bored through it. The screw hole, now at the top of the plunger 33, is threaded to receive the sensor opening 53 of the pressure sensor 37. The sensor holder 35 is added between the conduit pipe 31 and the plunger 33. The top cap assembly 39 is modified to remove the operating nut and associated structure and to add the pipe nipple 63, pipe fitting 65, and cord grip 67. The re-use of existing parts reduces the cost of the pressure sensor assembly.

Figure 7:
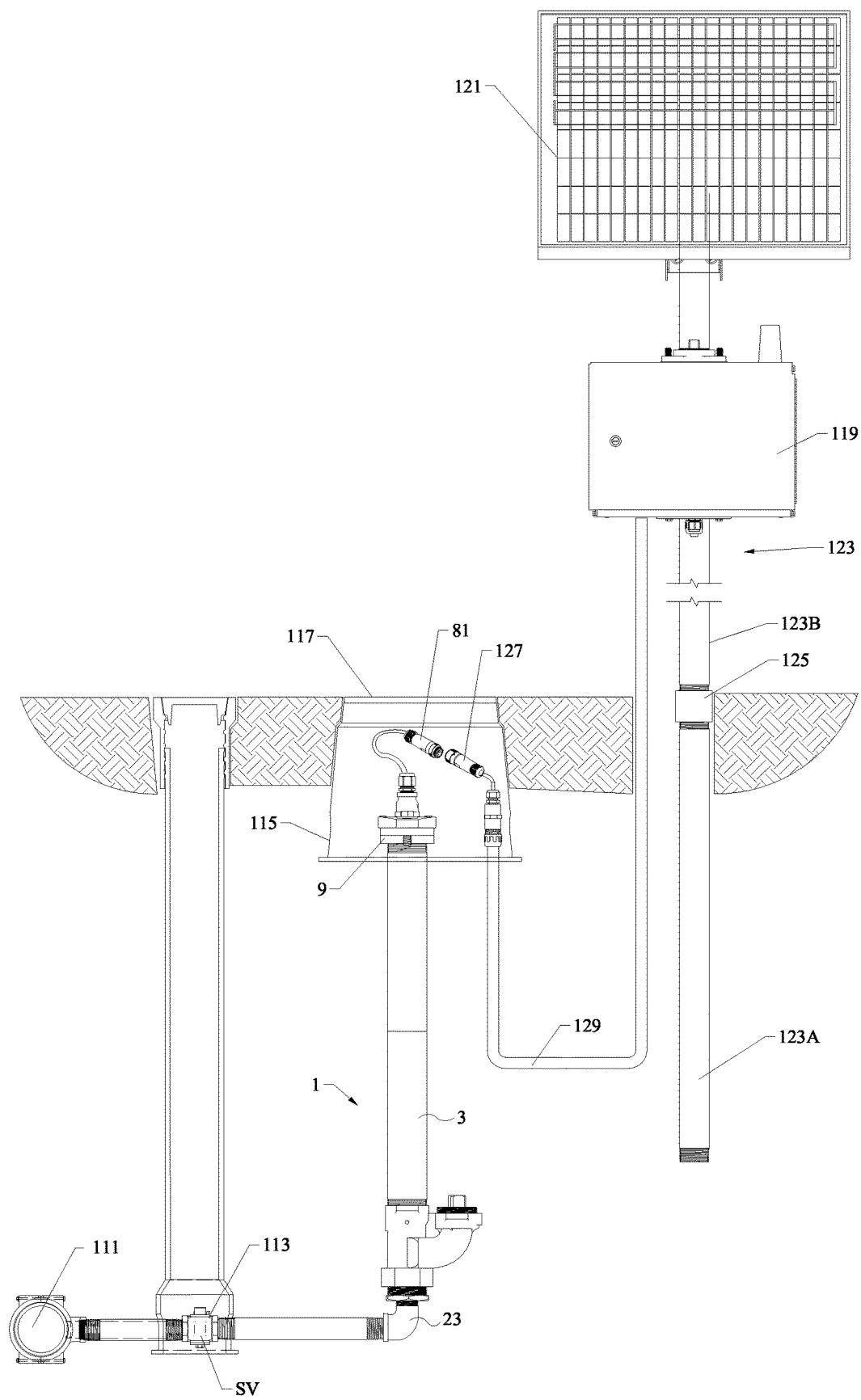
FIG. 7 is a somewhat diagrammatic view in front elevation of the pressure sensor assembly of FIGS. 1-6, installed in the ground and electrically attached to a post carrying a control box and a solar panel for powering the pressure sensor assembly and the controls in the control box.

FIG. 7 shows an illustrative installation of the pressure sensor assembly of FIGS. 1-6. The pressure sensor assembly 1 is buried with its lower end at the level of a subterranean water system 111. The elbow 23 is connected to the water system 111 through a shutoff valve SV, in the form of a ball valve curbstop 113. The top cap assembly 39 is housed in a valve box 115 having a removable cover 117, leaving the top cap assembly a few inches below grade.

Power and communications for the pressure sensor assembly 1 is provided through an instrument box 119 powered by a solar panel 121, both mounted on a mast 123.

The instrument box 119 is a standard electrical enclosure containing rechargeable batteries, a charge controller connected between the solar panel 121 and the batteries to maintain a constant charge on the batteries, a signal conditioner connected to receive a signal from the pressure sensor 37 through wire bundle 79, and a transmitter and an antenna to transmit pressure information to a remote location. These components are well known in the art.

The solar panel 121 is sized to provide adequate power to keep the battery charged, particularly in cold weather.

The mast 123 is formed as a lower pipe 123A buried in the ground, preferably in concrete, and an upper pipe 123B extending from a ground-level coupling 125. The upper pipe 123B is illustratively fifty-six inches long. The instrument box 119 and solar panel 121 are secured to the mast 123 with U-bolts.

The coupling 125 allows the upper part of the mast 123 to be removed without leaving an above-ground hazard. Should the pressure measurement system 1 no longer be needed at the location, coupling 125 allows the upper pipe 123B to be removed with the instrument box 119 and solar panel 121; the pressure sensor assembly 103 may also be removed, and a simple plunger on a rod inserted in the barrel pipe 3, with an upper coupling to connect with the neck 9, to seal the plunger seat body 7.

The leak-proof electrical connector 81 is connected through a mating leak-proof electrical connector 127 to an underground cable 129 feeding the instrument box 119.

Installing the pressure sensor system 1 is simple. Water in the portion of the subterranean water distribution system 111 to which the sensor system 1 is to be connected is shut off. The pressure sensor assembly 1 is buried with the curb stop 113 and connected to the water distribution system 111. If the pressure sensor assembly is attached externally of a hydrant, the hydrant and pressure sensor assembly may be buried together. The usual blocking and gravel fill are placed around the lower end of the plunger seat body 7, and the hole filled. A separate hole is dug for the mast 123, and the lower end of the pipe 123A is sunk in a concrete partial fill. The coupling 125 and upper pipe 123B are attached. The instrument box 119 and solar panel 121 are attached to the upper pipe 123B, and the cable 129 is run from the valve box 115 to the instrument box 119. In many cases, it may be desirable to dig a single trench for the pressure sensor 1, cable 129, and mast 123.

Should the sensor 37 require servicing, or should replacement of the pressure sensor 37 with another sensor be desired, it is easily removed from above ground without digging and without the use of special tools. After turning off the water feeding the elbow 23, removing the bolts 75 allows the sensor assembly 103 to be pulled up and out of the protective barrel pipe 3. The sensor 37 can be removed from the sensor holder 35 by unscrewing the plunger 33 and removing the sensor 37 through the access opening 51. Replacing the sensor assembly 103 requires merely sliding it through the barrel pipe 3 until the plunger 33 slides into the plunger seat body 7 and forms a water-tight seal with it.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

Merely by way of example, the plunger may be integrated with the sensor holder. Other water condition sensors may be mounted to the rod, either in place of or in addition to the pressure sensor. The instrument box may communicate wirelessly with the pressure sensor. These variations are merely illustrative.

All patents, published patent applications, and literature mentioned herein are hereby incorporated by reference.

The invention claimed is:

1. In combination, a sensor assembly comprising a water condition sensor mounted in a subterranean water supply by a straight, elongate rod, a piston at a lower end of the rod, a protective pipe surrounding the rod, and structure at a lower end of the pipe forming a slidable seal with the piston.

2. The combination of claim 1 wherein the rod and sensor are moveable upward through the protective pipe to remove the sensor from the subterranean water supply.

3. The combination of claim 2 wherein the sensor is carried by a sensor holder, the sensor holder being attached to the lower end of the rod.

4. The combination of claim 3 wherein the sensor holder is open on at least one side to permit access to the water condition sensor when the rod and sensor are removed from the subterranean water supply.

5. The combination of claim 4 wherein an upper end of the rod is releasably attached to a fitting attached to the protective pipe, the fitting preventing vertical movement of the rod and sensor.

6. The combination of claim 5 wherein the fitting is accessible from ground level.

7. The combination of claim 6 wherein the fitting is within about one foot of ground level.

8. The combination of claim 1 wherein the rod is hollow, and wherein wires extend from the sensor through the rod.

9. The combination of claim 1 wherein the sensor is a pressure sensor.

10. The combination of claim 1 wherein the sensor is carried by a sensor holder positioned above the piston, the piston comprising a passage from the subterranean water supply to the sensor.

11. The combination of claim 1 wherein the piston comprises at least one O-ring seal.

12. A sensor assembly comprising a plunger at a lower end of the sensor assembly, a sensor holder above the plunger, the sensor holder carrying a water-condition sensor, a passage through the plunger in communication with the sensor, a hollow rod attached to the sensor holder, the hollow rod extending upwardly from the sensor holder, and a cap attached to an upper end of the rod, the sensor holder comprising an opening on at least on side of the sensor holder, the opening being sized to permit lateral access to the sensor and removal of the sensor from the sensor holder without removing the sensor holder from the hollow rod.

13. The sensor assembly of claim 12 wherein the plunger part comprises at least one exposed external O-ring.

14. The sensor assembly of claim 12 wherein the sensor is a pressure sensor.

15. The sensor assembly of claim 12 further comprising signal-carrying wires extending from the sensor and through the cap.

16. The sensor assembly of claim 12 wherein the cap has at least one diameter larger than any diameter of any other part of the sensor assembly.

17. A water condition sensor mounted in a subterranean water supply by a straight, elongate rod extending through a protective sleeve, the rod having a lower, distal end and an upper, proximal end, a lower fitting holding the condition sensor at the lower, distal end of the rod, and a mounting fitting at the upper, proximal end of the rod, a distal end of the protective sleeve being attached to a subterranean water pipe, and a structure at a proximal end of the protective sleeve, the structure being releasably attachable to the mounting fitting of the rod to position the rod in the protective sleeve.

18. The sensor of claim 17 wherein the lower fitting forms a slidable seal with the sleeve or with a cylindrical opening fixed with respect to the sleeve.

\* \* \* \* \*